US012196006B2

(12) United States Patent
Sprague

(10) Patent No.: US 12,196,006 B2
(45) **Date of Patent: *Jan. 14, 2025**

(54) PUSH PAD EXIT DEVICE FOR EMERGENCY DOOR EGRESS

(71) Applicant: C.R. Laurence Co., Inc., Los Angeles, CA (US)

(72) Inventor: Gary Sprague, Los Angeles, CA (US)

(73) Assignee: C.R. LAURENCE CO., INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,418

(22) Filed: Aug. 2, 2023

(65) Prior Publication Data

US 2023/0374825 A1 Nov. 23, 2023

Related U.S. Application Data

(63) Continuation of application No. 17/460,010, filed on Aug. 27, 2021, now Pat. No. 11,821,238, which is a continuation of application No. 15/956,241, filed on Apr. 18, 2018, now Pat. No. 11,118,378.

(51) Int. Cl.
*E05B 65/10* (2006.01)
*E05C 3/16* (2006.01)

(52) U.S. Cl.
CPC ...... *E05B 65/1093* (2013.01); *E05B 65/1006* (2013.01); *E05B 65/1053* (2013.01); *E05C 3/162* (2013.01)

(58) Field of Classification Search
CPC ............ E05B 65/1093; E05B 65/1006; E05B 65/1053; E05C 3/162
See application file for complete search history.

(56) References Cited

U.S. PATENT DOCUMENTS

| | | | |
|---|---|---|---|
| 89,942 | A | 5/1869 | Quayle |
| 288,028 | A | 11/1883 | Coultaus |
| 354,559 | A | 12/1886 | Lempert |
| 380,367 | A | 4/1888 | Tyden |
| 385,400 | A | 7/1888 | Bachman |

(Continued)

FOREIGN PATENT DOCUMENTS

| | | |
|---|---|---|
| DE | 299 01 960 | 6/1999 |
| DE | 202010001358 | 6/2011 |

(Continued)

*Primary Examiner* — Mark A Williams
(74) *Attorney, Agent, or Firm* — Cislo & Thomas, LLP

(57) ABSTRACT

A push pad exit device comprising a horizontal push bar actuator mechanically linked to a vertical door handle assembly, for use on the interior side of entrance doors where a means of emergency egress is desired, is presented. The operating mechanisms of the push bar actuator and vertical door handle assembly are concealed presenting a smooth uncluttered appearance. In one mode of operation, the push pad actuator may be moved inwards towards the door face causing the door to unlatch. The push pad exit device may also be equipped with a "dogging feature" which locks the push bar actuator in the unlatched position. In this mode of operation the door is unlatched and the push pad actuator may be used as a fixed door handle. The push pad exit device may also be equipped with a keyed lock on an external face of the door.

9 Claims, 10 Drawing Sheets

(56) References Cited

U.S. PATENT DOCUMENTS

| | | | | |
|---|---|---|---|---|
| 770,642 | A | 9/1904 | Hyers | |
| 783,033 | A | 2/1905 | Fraser | |
| 792,129 | A | 6/1905 | Heard | |
| 874,659 | A | 12/1907 | Conklin | |
| 995,831 | A | 6/1911 | Winter | |
| 1,038,111 | A | 9/1912 | Foss | |
| 1,057,995 | A | 4/1913 | Bull | |
| 1,111,426 | A | 9/1914 | Ziganek et al. | |
| 1,145,471 | A | 7/1915 | Dobrick | |
| 1,179,606 | A | 4/1916 | Bull et al. | |
| 1,180,813 | A | 4/1916 | Ziganek | |
| 1,194,637 | A | 8/1916 | Joy | |
| 1,214,230 | A | 1/1917 | Sheppard | |
| 1,256,992 | A | 2/1918 | Edgar et al. | |
| 1,378,504 | A | 5/1921 | White | |
| 1,417,815 | A | 5/1922 | Fischer | |
| 1,486,595 | A | 3/1924 | Marcum | |
| 1,533,826 | A | 4/1925 | Butterworth | |
| 2,066,080 | A | 12/1936 | Emory | |
| 2,349,301 | A | 5/1944 | Overby | |
| 2,445,119 | A | 7/1948 | Ledin | |
| 2,503,076 | A | 4/1950 | Smith | |
| 2,604,343 | A | 7/1952 | Fredholm | |
| 2,627,081 | A | 2/1953 | Slopa | |
| 2,660,464 | A | 11/1953 | Rosenblum | |
| 2,660,465 | A | 11/1953 | Gerson | |
| 2,670,979 | A | 3/1954 | Fernandez | |
| 2,680,036 | A | 6/1954 | Gill | |
| 2,714,029 | A | 7/1955 | Loeb | |
| 2,785,915 | A | 3/1957 | Daffurn et al. | |
| 2,792,244 | A | 5/1957 | Loeb | |
| 2,832,623 | A | 4/1958 | Golemon | |
| 2,983,536 | A | 5/1961 | Heyer et al. | |
| 3,141,691 | A | 7/1964 | Gunard | |
| 3,151,900 | A | 10/1964 | Ahlgren | |
| 3,163,452 | A | 12/1964 | Knox et al. | |
| 3,239,261 | A | 3/1966 | Knox et al. | |
| 3,287,043 | A | 11/1966 | Delhase | |
| 3,561,803 | A | 2/1971 | Schlage | |
| 3,663,047 | A | 5/1972 | Zawadzki | |
| 3,670,537 | A | 6/1972 | Horgan, Jr. | |
| 3,696,648 | A | 10/1972 | Horgan, Jr. | |
| 3,910,611 | A | 10/1975 | Slovensky | |
| 4,366,974 | A | 1/1983 | Horgan, Jr. | |
| 4,382,620 | A * | 5/1983 | Horgan, Jr. | E05B 65/106 292/336.3 |
| 4,418,949 | A | 12/1983 | Horgan, Jr. | |
| 4,506,922 | A | 3/1985 | Horgan, Jr. | |
| 4,641,865 | A | 2/1987 | Pastva | |
| 4,711,480 | A * | 12/1987 | Horgan, Jr. | E05C 19/166 49/141 |
| 4,819,976 | A | 4/1989 | Bert | |
| 4,895,399 | A | 1/1990 | Horgan, Jr. | |
| 4,961,330 | A | 10/1990 | Evans | |
| 5,203,115 | A | 4/1993 | Marinoni | |
| 5,456,504 | A | 10/1995 | Brillant | |
| 5,464,259 | A | 11/1995 | Cohrs et al. | |
| 5,938,248 | A | 8/1999 | Vickers et al. | |
| 6,000,733 | A | 12/1999 | Linder | |
| 6,511,104 | B1 * | 1/2003 | Horgan, Jr. | E05B 3/00 292/336.3 |
| 6,592,156 | B2 | 7/2003 | Levine | |
| 6,746,060 | B2 | 6/2004 | O'Brien | |
| 6,820,905 | B1 | 11/2004 | Haeck et al. | |
| 7,044,510 | B2 | 5/2006 | Lin | |
| 7,513,542 | B2 | 4/2009 | Schumm | |
| 7,887,107 | B2 | 2/2011 | Shen | |
| 9,303,444 | B1 | 4/2016 | Choi | |
| 9,580,944 | B2 | 2/2017 | Arlinghaus et al. | |
| 11,118,378 | B1 * | 9/2021 | Sprague | E05B 65/1006 |
| 11,821,238 | B2 | 11/2023 | Sprague | |
| 2002/0100234 | A1 | 8/2002 | Sprague | |
| 2004/0094973 | A1 | 5/2004 | Sprague | |
| 2005/0144822 | A1 | 7/2005 | Molokotos et al. | |
| 2005/0184531 | A1 * | 8/2005 | Lin | E05B 65/1053 292/92 |
| 2007/0046038 | A1 | 3/2007 | Schlack et al. | |
| 2009/0113955 | A1 * | 5/2009 | Ambrass | E05B 65/0025 70/107 |
| 2009/0194999 | A1 | 8/2009 | Shen | |
| 2010/0066101 | A1 * | 3/2010 | Shen | E05B 65/1006 292/21 |
| 2010/0109352 | A1 | 5/2010 | Tien et al. | |
| 2010/0117376 | A1 * | 5/2010 | Shen | E05B 65/1006 292/92 |
| 2013/0127184 | A1 | 5/2013 | Tien | |
| 2013/0154283 | A1 * | 6/2013 | Arlinghaus | E05B 47/023 292/214 |
| 2014/0132009 | A1 | 5/2014 | Chiang et al. | |
| 2015/0033629 | A1 | 2/2015 | Barwick et al. | |
| 2015/0159410 | A1 | 6/2015 | Stallbaumer | |
| 2015/0330120 | A1 | 11/2015 | Hogan et al. | |
| 2016/0002961 | A1 | 1/2016 | Graham | |
| 2016/0002963 | A1 | 1/2016 | Kondi et al. | |
| 2016/0376816 | A1 * | 12/2016 | Graham | E05B 65/1053 292/197 |
| 2017/0191288 | A1 * | 7/2017 | Lin | E05B 65/1006 |
| 2017/0218662 | A1 * | 8/2017 | Thompson | E05C 1/12 |
| 2020/0370332 | A1 * | 11/2020 | Baker | F16F 15/08 |

FOREIGN PATENT DOCUMENTS

| | | |
|---|---|---|
| EP | 1 405 979 | 4/2004 |
| JP | 3073659 | 8/2000 |
| JP | 2013213375 | 10/2013 |

* cited by examiner

PUSH PAD EXIT DEVICE FOR EMERGENCY DOOR EGRESS

CROSS-REFERENCES TO RELATED APPLICATION

This application claims priority as a continuation of U.S. patent application Ser. No. 17/460,010 entitled "Push Pad Exit Device for Emergency Door Egress," filed on Aug. 27, 2021, which is a continuation of U.S. patent application Ser. No. 15/956,241 (now U.S. Pat. No. 11,118,378) entitled "Push Pad Exit Device for Emergency Door Egress," filed Apr. 18, 2018, both of which are incorporated herein by this reference.

FIELD OF THE INVENTION

The present invention relates generally to panic handles for doors and more particularly to panic handles featuring a horizontally oriented push bar mechanically connected to a vertically oriented latch mechanism.

BACKGROUND OF THE INVENTION

A panic handle exit device allows persons within the interior of a room or building to readily open a door in a latched position by simply pushing on an interior handle for unlatching the door. The interior handles of a panic handle exit device typically comprise a push bar mounted to the door.

The push bar is mechanically linked to a door latch mechanism for locking and unlocking the door. The push bar is typically movable in a pivoting motion from a locked position (i.e. a position away from the door) to an unlocked position (i.e. a position close to the door) to actuate the door latch mechanism when pressure is applied along the surface of the push bar. Depressing the push bar toward the door translates a mechanical linkage for actuating the door latch mechanism in order to retract the door latch so that the door can be opened. A primary benefit of panic exit devices is that they provide unlatching of the door in a quick and simple manner. For this reason, panic exit devices are often utilized in applications which require ready exit from a building in case of an emergency.

In some panic exit devices, a fixed exterior handle is included to provide a symmetrical appearance. In addition, the door latch may be actuated from the exterior side of the door via a lock mechanism using a key or key pad. Typically the lock mechanism may be a mechanical lock, a magnetic lock or a solenoid operated lock.

While many panic handle designs are known in the art, there remains room for improvement.

SUMMARY OF THE INVENTION

The present invention improves upon the prior art by providing a push pad exit device having a push pad actuator mounted horizontally onto an interior surface of a door, fixedly connected to the door at the door's hinge side, and fixedly mounted to a vertically oriented door handle assembly located on the interior surface of the door at the door's latch side. The interior vertical handle assembly is fixedly mounted to the interior surface of a door at the bottom and/or top of the door, and at a centrally located interior housing located on the interior surface of the door. The interior vertical handle assembly conceals a latch mechanism comprising linkages that operate the latching bolt assemblies at the top and/or bottom of the door.

The push pad actuator and associated interior vertical handle assembly will typically be used on building entrance doors and other doors where emergency egress is desired. The push pad actuator and interior vertical handle assembly optionally include a "dogging" feature wherein the dogging feature holds the latch mechanism in the unlatched or unlocked position and thereby allows the door to open and close freely from the exterior surface or side of the door, which typically corresponds to the exterior of a building or room from which emergency egress is desired.

In addition, the door may be equipped with a centrally located exterior housing on its exterior surface that includes a key-lock mechanism which communicates with the centrally located interior housing via a push rod that defeats the latch mechanism and thereby allows a user to unlock a locked door from the outside.

Experimentation has shown that locating the push bar actuator and centrally located interior and exterior housings at a position of about 42" above a finished floor, is the most ergonomically desirable position for a majority of users. In one preferred embodiment for use with glass doors, a fixed exterior vertical handle is located adjacent the interior vertical handle such that the exterior and interior handles appear as one continuous handle. It is preferable that the interior and exterior vertical door handles are both the full height of the door. It is further desirable that the push pad actuator be visibly labeled with a "PUSH" indicator, which may be engraved on the actuator.

The above and other advantages of the push pad exit device of the present invention will be described in more detail below.

DETAILED DESCRIPTION OF THE PREFERRED EMBODIMENTS

The present invention will now be described more fully hereinafter with reference to the accompanying drawings, in which preferred embodiments of the invention are shown. The invention may, however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Figure 1:
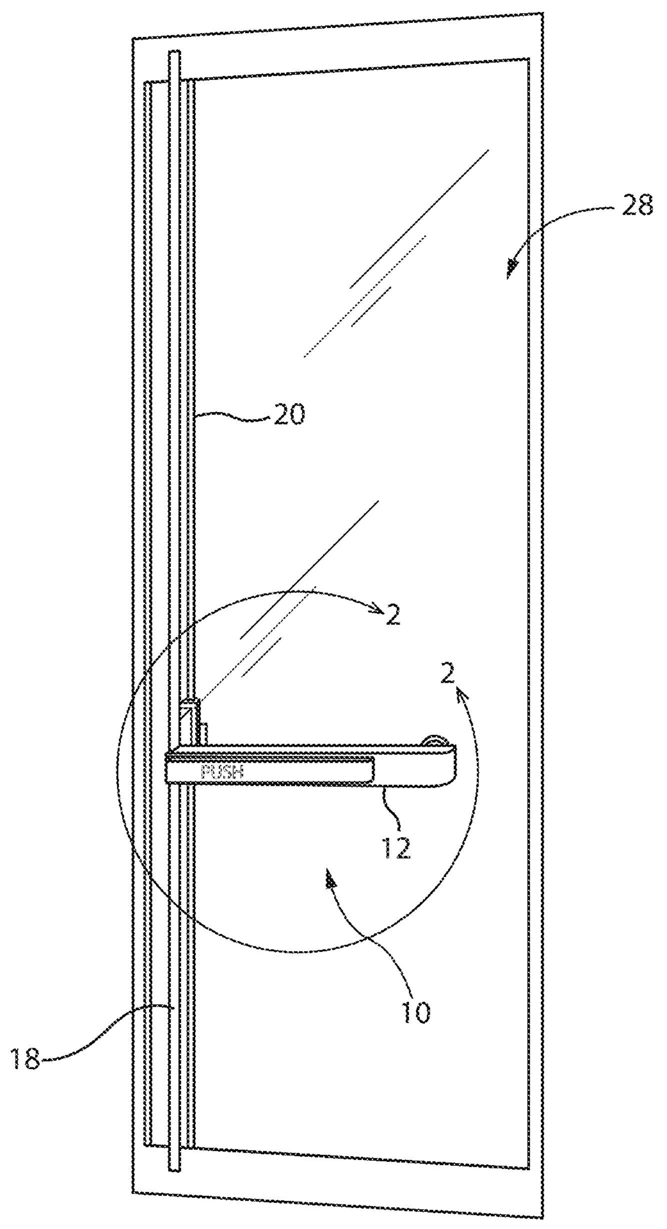
FIG. 1 is a perspective view of a glass door with the push pad exit device of the present invention installed.
Figure 2:
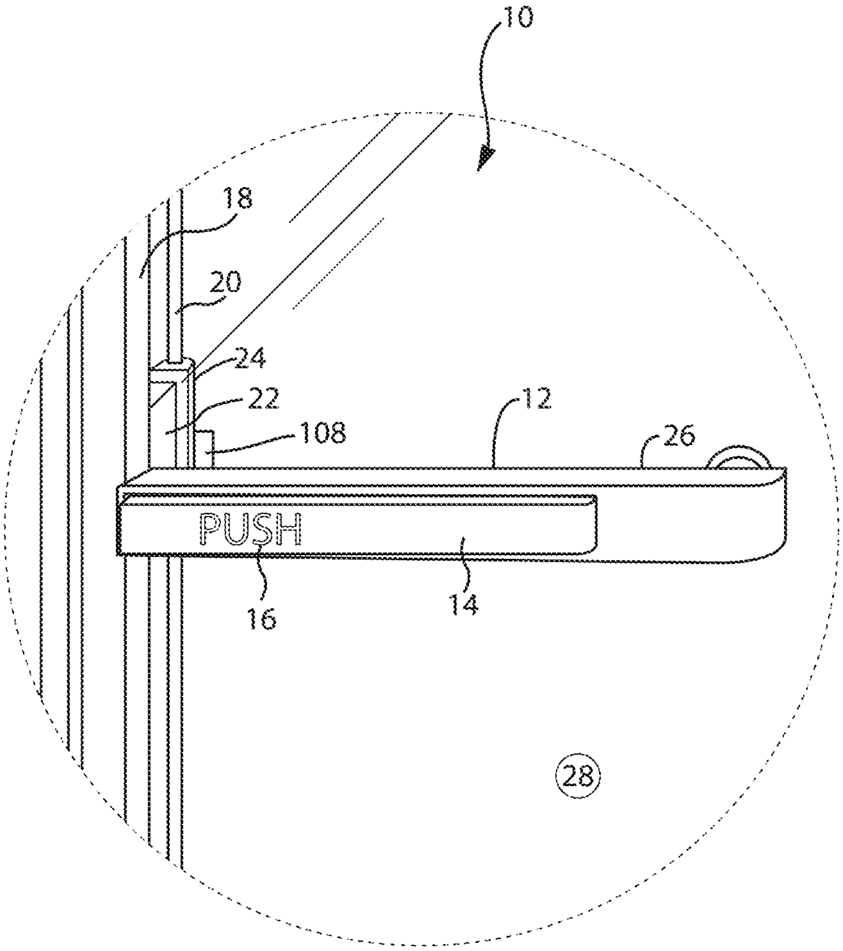
FIG. 2 is an enlarged detail view showing the push pad exit device of FIG. 1 installed on a glass door.
Figure 3:
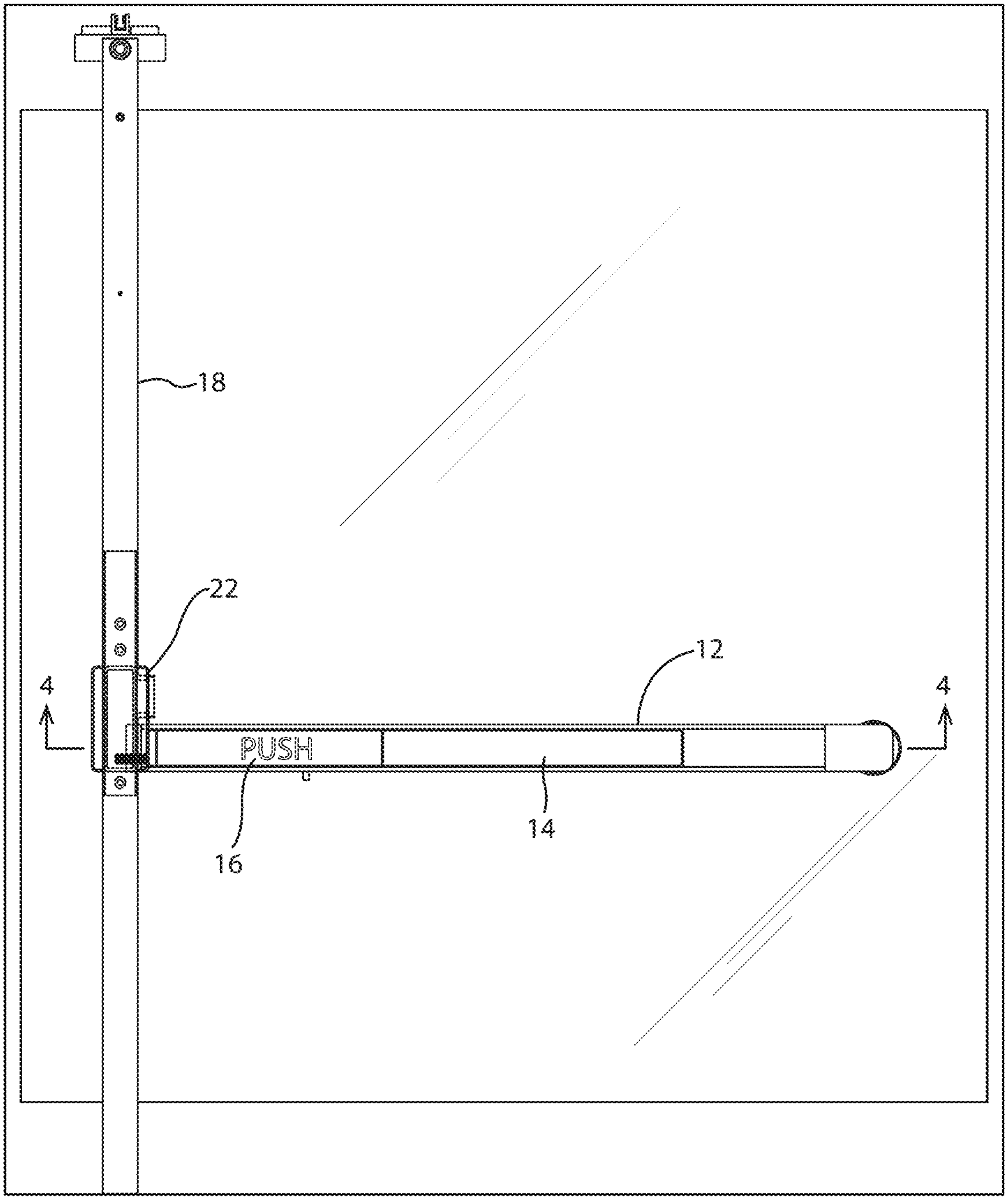
FIG. 3 is a front plan view of the push pad exit device of FIG. 1.

With reference to FIGS. 1 and 2, the appearance of the push pad exit device 10 of the present invention is shown. The push pad exit device 10 generally comprises a horizontal push pad actuator 12, an interior vertical door handle assembly 18, an exterior vertical door handle assembly 20 (optional), a centrally located interior housing 22, a centrally located exterior housing 24 (optional) and a lock 108 (optional).

As shown by FIGS. 1 and 2, the horizontal push pad actuator 12, interior vertical door handle assembly 18, exterior vertical door handle assembly 20, centrally located interior housing 22, and centrally located exterior housing 24 are mounted to a door 28. In typical installations, the door 28 will be either a single or double pane glass door.

Figure 4A:
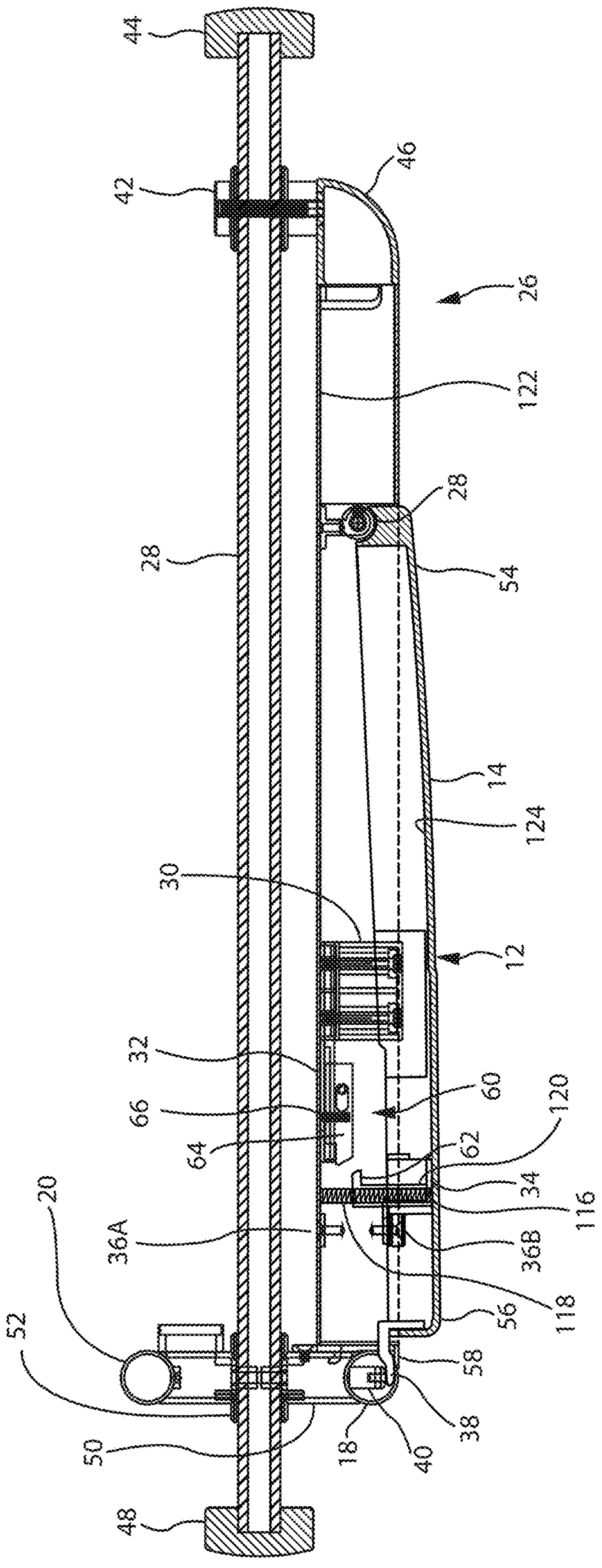
FIG. 4A is a sectional view of the push pad exit device taken along the line 4-4 of FIG. 3, showing the push pad actuator in the latched position.
Figure 4B:
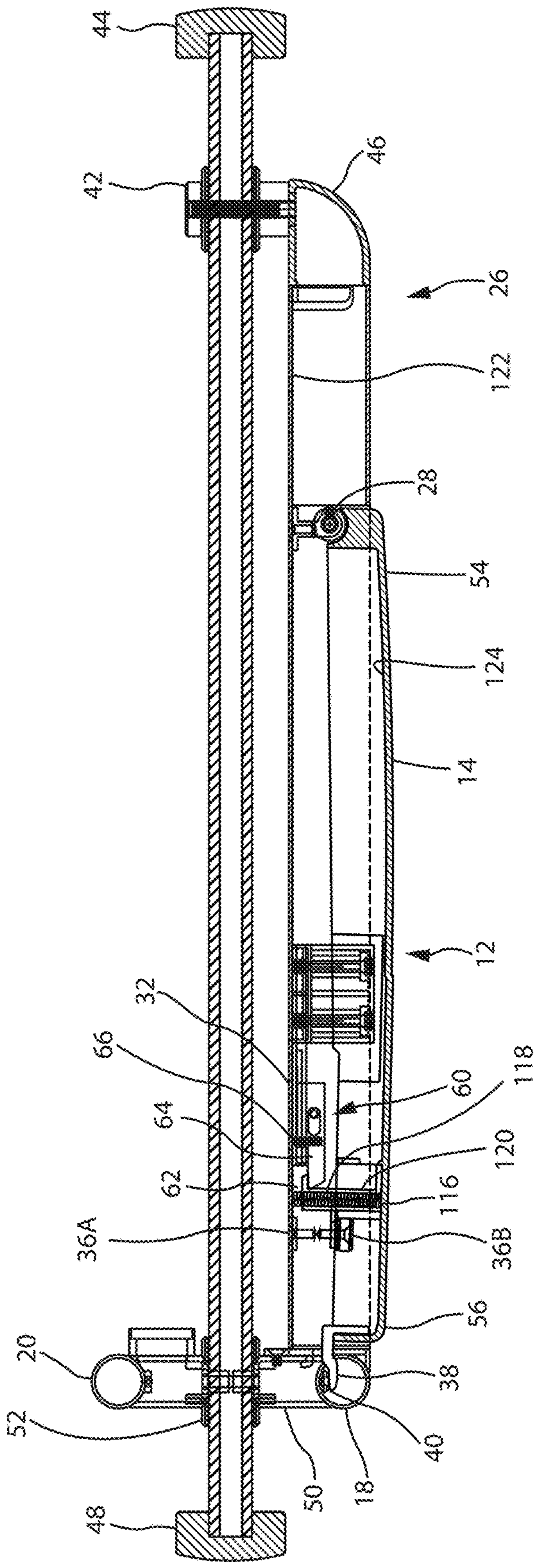
FIG. 4B is a sectional view of the push pad exit device taken along the line 4-4 of FIG. 3, showing the push pad actuator in the unlatched position.

Referring to FIGS. 1-6 and 4A-4B and 6A-6B, in particular, the overall operation of the push pad exit device 10 of the present invention will be described. As shown in FIGS. 2 and 4, the push pad actuator 12 includes a push pad actuator housing 26 and a push pad actuator arm 14. The front face of the actuator arm 14 will typically be engraved or otherwise marked with nomenclature 16, such as the word "PUSH," to make clear where the push pad actuator 12 must be pushed to operate the push pad exit device 10. (See FIG. 2.)

With reference to FIGS. 2, 4A and 4B, the push pad actuator housing 26 is fixed at one end 46 near a pivoting end 44 of the door 28 and at another end 50 near a free or swinging end 48 of the door 28. For purposes of illustration only, a double pane swinging glass door is shown schematically in the figures. The push pad exit device 10 is not limited to use with double pane glass doors but rather may be used with any type of swinging door, i.e. including single pane glass doors and non-glass, i.e. wood or metal, doors. Suitable attachment hardware 42 and 52 for attaching the push pad actuator housing 26 at the pivoting end 44 and free or swinging end 48 of the door 28 is known in art. Such hardware will vary in configuration depending upon the specific type of door construction, i.e. glass, double pane glass, or wood or metal.

With continued reference to FIGS. 4A and 4B, the push pad actuator 12 includes the push pad actuator arm 14. The push pad actuator arm 14 has a pivoting end 54 and a free end 56. The pivoting end 54 is connected to the push pad actuator housing 26 by a pivot assembly 28. The push pad actuator arm 14 is constrained against lateral or side-to-side movement by a guide block 30. Rotational movement of the push pad actuator arm 14 is limited in a direction outward with respect to a plane of the door 28 by a blocking surface 58 located on the push pad actuator housing 26. Rotational movement of the push pad actuator arm 14 inwardly towards the plane of the door is limited by travel stop limiter screws 36A and 36B, The free end 56 of the push pad actuator arm 14 includes a connecting tongue 38 which contacts a motion transfer link 40 contained within the interior vertical door handle 18.

The push pad actuator arm 14 is biased in an outward or door locked position by a biasing spring 116 which at one end is inserted in a bore 120 in a catch fitting 34 wherein the spring end bears against a wall surface 124 of the push pad actuator arm 14. Another end of the biasing spring 116 is inserted into a plunger 118, wherein the plunger 118 resides partially within the bore 118 of the catch fitting 34. The plunger 118 bears against a wall surface 122 of the push pad actuator housing 26.

FIG. 4A shows the push pad actuator 12 in a first or latched position. In this position, the push pad actuator 12 is biased, by the motion traversing link 40 and the return spring 116, such that the connecting tongue 38 is in contact with the blocking surface 58 located on the push pad actuator housing 26. FIG. 4B shows the push pad actuator 12 in a second or unlatched position. In this position, the actuator 12 is biased, by a user pushing on the actuator arm 14, such that the travel limiting screws 36A and 36B are in contact.

The push pad actuator 12 may optionally be equipped with a manual catch or dogging assembly 60 which comprises a catch fitting 34 having a catch 62 and a slide assembly 32 having a slide member 64 and a finger extension 66 attached to the slide member 64. The manual catch 60 allows a user to lock the door 28 in an unlatched position which thereby allows door to swing freely and the push pad actuator 12 to be used as an interior door handle. The manual catch 60 is simple to operate. A user need only depress the push pad actuator arm 14 until it contacts the travel limit screws 36A and 36B, i.e. until it stops moving, and slide the slide member 64 towards the free end 48 of the door 28 until movement stops. At this point, the slide member 64 will have engaged the catch 62 and the door 28 will be held in an unlatched position. The manual catch 60 is shown in the engaged position in FIG. 4B and in the disengaged position in FIG. 4A.

Figure 5:
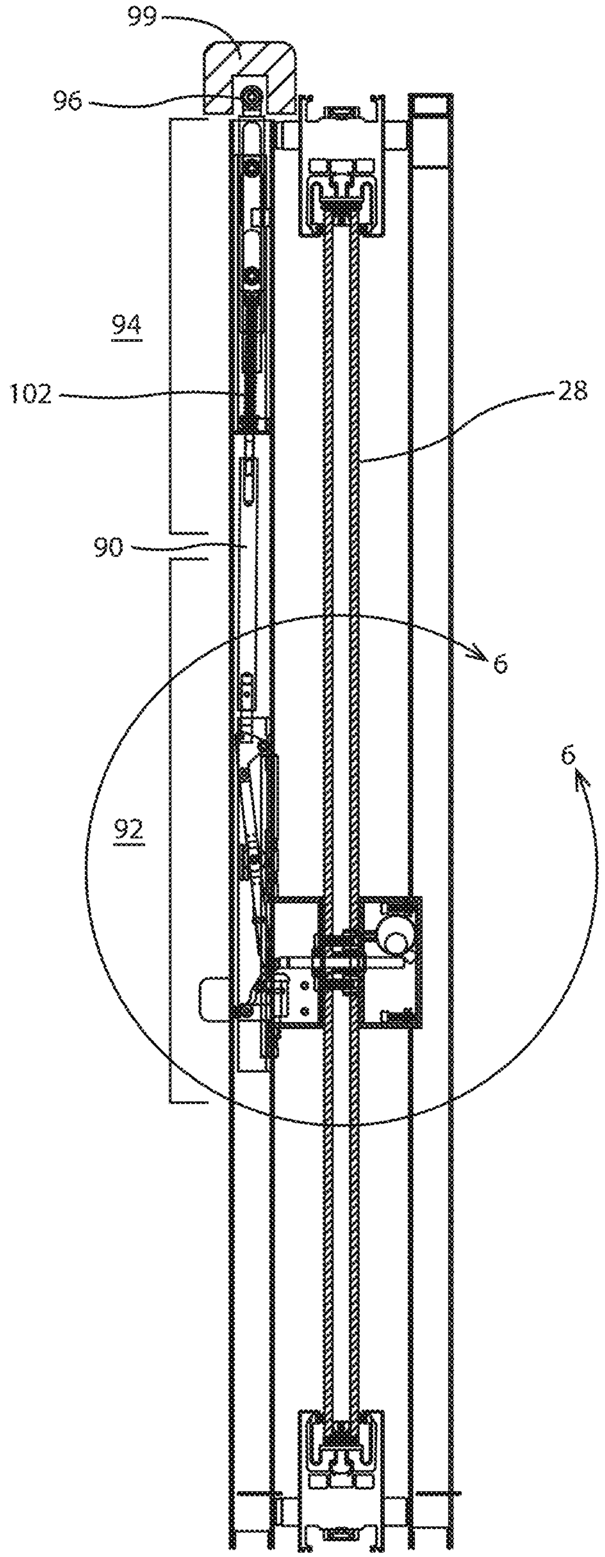
FIG. 5 is a left end view of the glass door of FIG. 1.
Figure 6A:
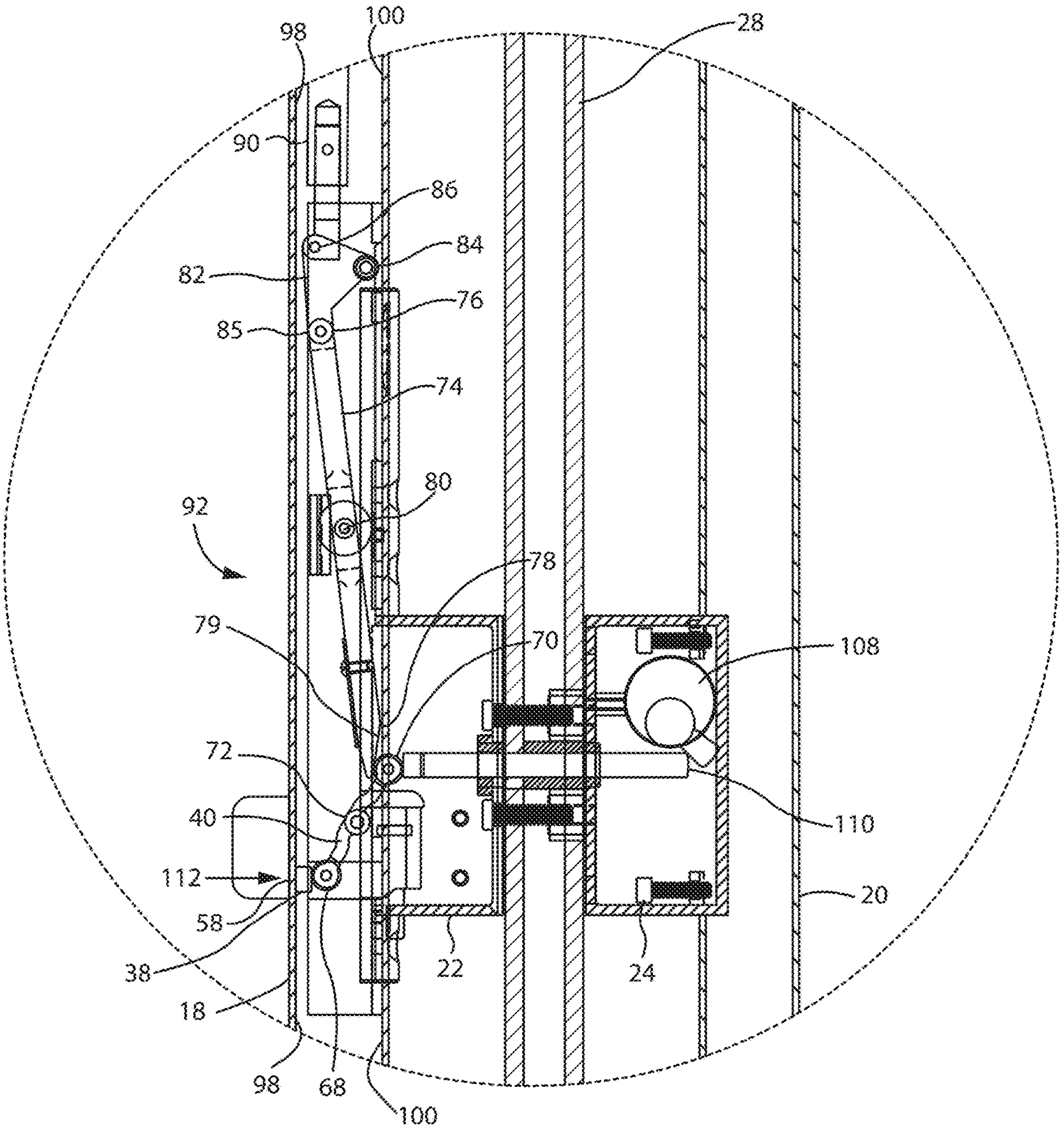
FIG. 6A is an enlarged detail sectional view of a portion of FIG. 5, as shown by circle 6-6 of FIG. 5, showing the latching mechanism in the latched position.
Figure 6B:
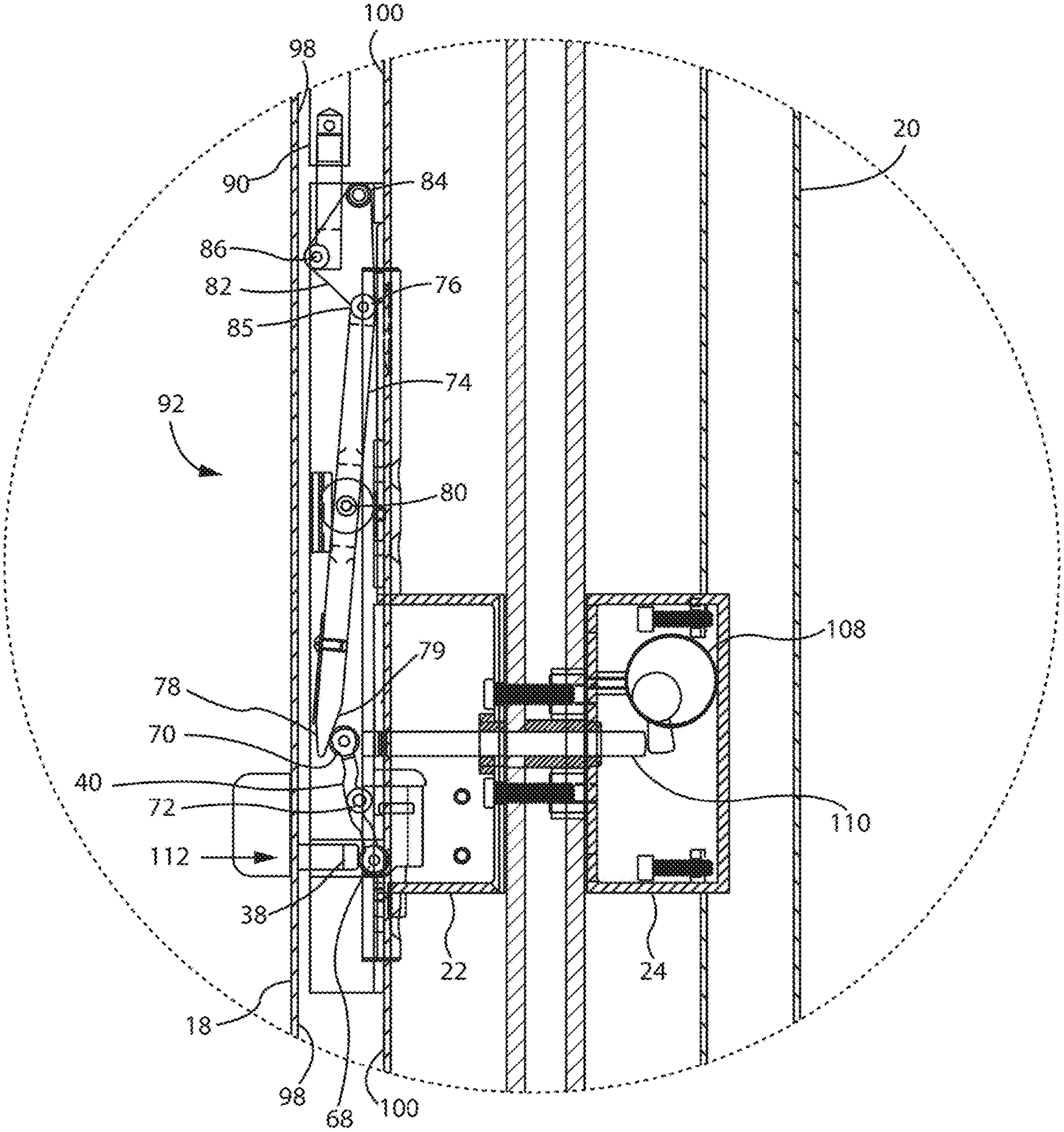
FIG. 6B is an enlarged detail sectional view of FIG. 5, as shown by circle 6-6 of FIG. 5, showing the latching mechanism in the unlatched position.

Referring now to FIGS. 5, 6A and 6B, enclosed within the interior handle 18 are a latching mechanism or latching assembly 92 and a representative latch bolt assembly 94 (see FIG. 5). The latching mechanism 92 and latch bolt assembly 94 are operable between a first latched position and a second unlatched position. Suitable latch bolt assemblies for use in the present invention are known in the art and are commercially available. (Blumcraft Part No. MPHTOP, is one such suitable latch bolt assembly.) As shown in FIG. 5, the representative latch bolt assembly 94 includes a biasing spring 102 that biases a latch bolt 96 upwardly into a recess 99 in a door frame (i.e. a first latched position) and is configured such that an upwardly directed biasing force is applied to a series of links, i.e. the motion transfer link 40, a lever arm 74, and an over-center link 82 which comprise the latching mechanism 92, as well as a connecting rod 90 which interconnects the latching mechanism 92 with the latch bolt assembly 94 (see FIGS. 6A and 6B).

The upwardly directed biasing force applied by biasing spring 102 biases the latching assembly 94 and its associated components, i.e. motion transfer arm 40, lever arm 74 and over-center link 82, into the first latched position, as shown in FIG. 6A. The operation of the latching mechanism 92 of the present invention will be described hereinafter.

As shown in FIG. 5, the latch bolt 96 engages a latching recess 99 which secures the door 28 in the latched position. With reference to FIGS. 6A and 6B, the door is unlatched when a force 112 is applied to the push pad actuator arm 14 which overcomes the biasing force applied by biasing spring 102 of the latch bolt assembly 94 and which causes the connecting tongue 38 to depress inwardly a lower link end 68 of the motion transfer link 40 which initiates a sequence of events which causes the lever arm 74, over-center link 82 and connecting rod 90 to withdraw the latch bolt 96 from the latching recess 98 and allow the door 28 to swing freely.

With reference to FIGS. 6A and 6B, an inwardly directed force 112 (from pushing on the push pad actuator arm 14) overcomes the biasing force applied by biasing spring 102 and causes the connecting tongue 38 to depress or push the lower link end 68 from a first latched position on interior wall surface 98 (see FIG. 6A) of the interior vertical handle 18 to a second unlatched position an opposite interior wall surface 100 (see FIG. 6B) of the handle 18. This causes motion transfer link 40 to pivot about pivot point 72 such that upper link end 70 of the motion transfer link 40 moves from its first latched position at interior wall surface 100 (see FIG. 6A) to a second unlatched position on opposite interior wall surface 98 (see FIG. 6B). This in turn causes upper link end 70 of the motion transfer link 40 to press upon lower link end 78 of the lever arm 74 and causes the lever arm 74 to move from its first latched position on interior wall surface 100 (see FIG. 6A) to a second unlatched position on opposite interior wall surface 98 (see FIG. 6B).

It should be noted that the function of the motion transfer link 40 is to convert horizontal motion from the push pad actuator arm 14 via connecting tongue 38 into vertical motion in the latching mechanism 92.

In moving from its first latched position to its second unlatched position, motion transfer link 40 causes lever arm 74 to pivot about pivot point 80 and therein causes upper link end 76 to move from its first unlatched position on interior wall surface 98 (see FIG. 6A) to a second latched position on opposite interior wall surface 100. This motion causes the over-center link 82 to change position from its first latched position (see FIG. 6A) to a second unlatched position as shown in FIG. 6B. This in turn causes connecting rod 90 to be pulled downwardly which pulls the bolt assembly 94 downwardly causing bolt 96 to be withdrawn from bolt recess 99 (see FIG. 5), i.e. to a second unlatched position, thereby unlatching the door 28. Once unlatched, if desired, the latching mechanism 92 (and push pad actuator arm 14) may be retained in the unlatched position by actuation of the manual catch assembly or dogging mechanism 60, as described above.

Lower and upper link ends 68 and 70 of the motion transfer link 40 will typically be equipped with rollers. Lower link end 78 of lever arm 74 is configured as an angled surface or wedging surface 79. Upper link end 70 of motion transfer link 40 will typically roll against the angled surface 79, when moving from its first latched position to its second unlatched position. Upper link end 70 may also be configured to slide against the angled surface 79. Similarly, connection point 84 of over-center link 82, will typically be equipped with a roller. When moving from its first latched position to its second unlatched position, connection point 84 will roll upwardly along the interior wall surface 100 of the door handle 18 and will roll downwardly along the interior wall surface 100 when returning to its first latched position. Connection point 84 may also be configured to slide against interior wall surface 100.

Upon the removal of pushing force 112 (inwardly directed force) from the push pad actuator arm 14, upwardly directed biasing force applied by the biasing spring 102 of bolt assembly 94 causes the lever arm 74 to rotate (or flip) from its unlatched position (see FIG. 6B) back to its latched position (see FIG. 6A). Upper link end 76 of lever arm 74 and connection point 85 of over-center link 82, will typically be connected via a common roller. Connection point 84 of the over center link 82 will typically be equipped with a roller. The connection at connection point 86 between the over-center link 82 and connecting rod 90 will typically be a pinned connection.

Release, i.e. removal of actuation force 112 from the push pad actuator arm 14 will cause the latching mechanism 92 and bolt assembly 94 to return to their latched positions due to the upwardly directed force exerted by biasing spring 102 which pulls the connecting rod 90, over-center link 82, lever arm 74, and motion transfer link 40 to their first latched positions.

With continued reference to FIGS. 6A and 6B, the push pad exit device 10 of the present invention may also be equipped with an optional lock 108, illustrated schematically, that allows a user to open the door 28 from the outside with the door in its latched or locked position. In such an installation, the push pad exit device 10 will typically be equipped with the centrally located interior and exterior housings 22 and 24, respectively. Located within the centrally located exterior housing 24 is an exterior lock 108 which in a preferred embodiment is a keyed lock. However, the lock may also be a key pad or magnetic card style lock. The lock is configured to operate a push rod 110 which bears against upper link end 70 of the motion transfer link 40. When the push pad exit device 10 is in the latched or locked position, actuation of the exterior lock 108 causes the push rod 110 to push upper link end 70 from its first latched position on wall surface 100 (see FIG. 6A) to its second unlatched position on the opposite wall surface 98 (see FIG. 6B) and therein sets in motion the sequence of events described above that unlatches or unlocks the door.

Push Pad Actuator Arm—Alternative Embodiment

Figure 7A:
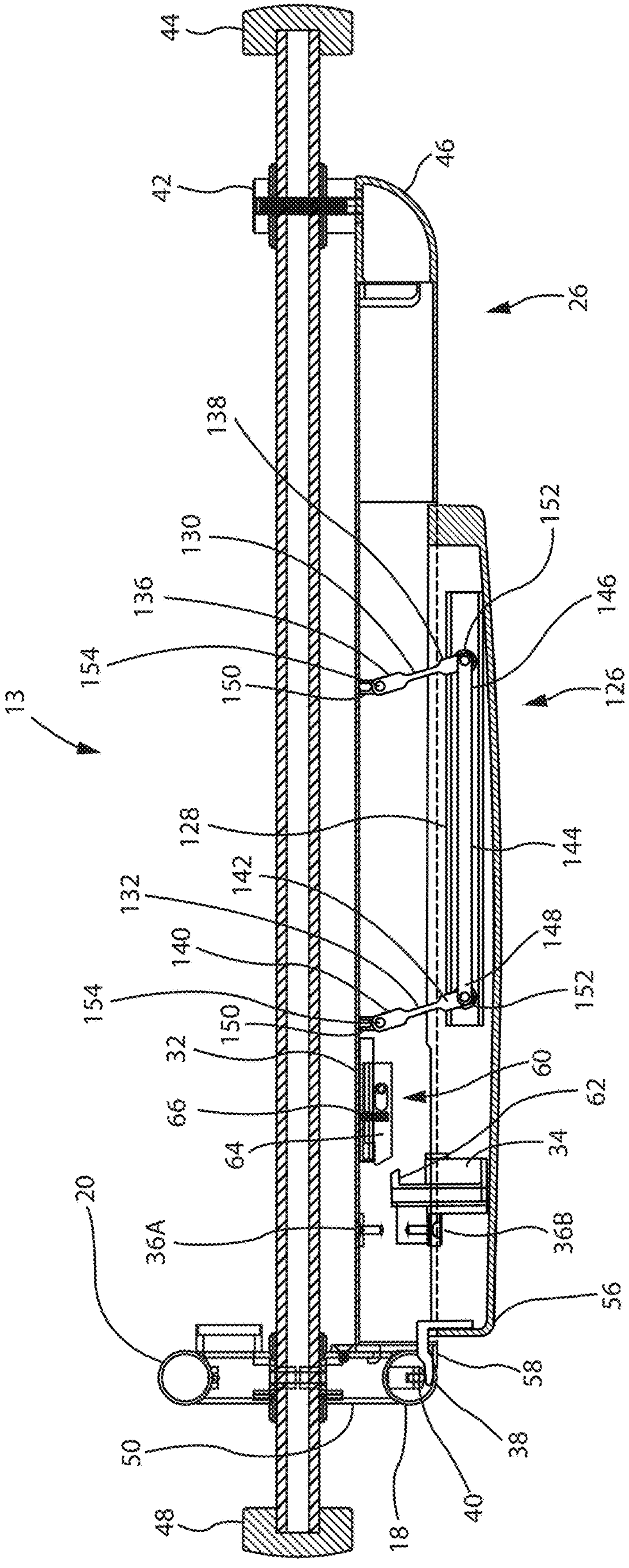
FIG. 7A is a sectional view of the push pad exit device taken along the line 4-4 of FIG. 3, showing an alternative embodiment of the push pad actuator in the latched position.
Figure 7B:
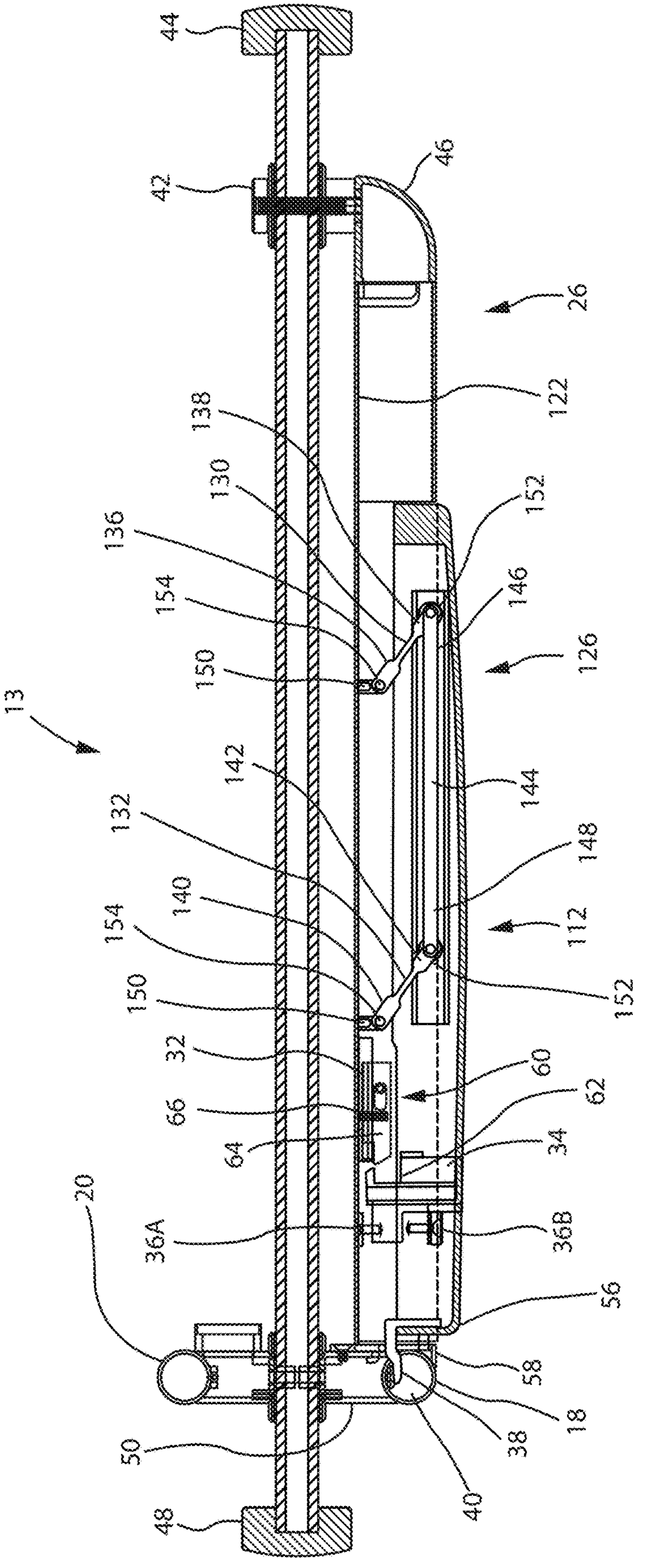
FIG. 7B is a sectional view of the push pad exit device taken along the line 4-4 of FIG. 3, showing an alternative embodiment of the push pad actuator in the unlatched position.

Referring now to FIGS. 7A and 7B, an alternative embodiment of the push pad actuator 13 is shown. FIG. 7A shows the alternative embodiment of the push pad actuator 13 in a first or door locked position. FIG. 7B shows the alternative embodiment of the push pad actuator 13 in a second or door unlocked position. The alternative embodiment of the push pad actuator 13 is similar to that of FIGS. 4A and 4B with the exception that a parallel linkage assembly 126 is used to actuate the push pad actuator arm 14, whereas in the embodiment shown in FIGS. 4A and 4B, the push pad actuator arm 14 pivoted about pivot 28 on the push pad actuator housing 26.

As in the pivoting embodiment of FIGS. 4A and 4B, in the parallel linkage embodiment of FIGS. 7A and 7B, the push pad actuator 13 includes a push pad actuator housing 26 and a push pad actuator arm 14. The front face of the push pad actuator arm 14 will typically be engraved or otherwise marked with nomenclature 16, such as the word "PUSH," to make clear where the push pad actuator arm 14 should be pushed to most effectively operate the push pad exit device 10. (See FIG. 2.)

With reference to FIGS. 2, 7A and 7B, the push pad actuator housing 26 is fixed at one end 46 near the pivoting end 44 of the door 28 and at another end 50 near the free or swinging end 48 of the door 28. For illustrative purposes only, a double pane swinging glass door is shown schematically in the figures. Suitable attachment hardware 42 and 52 for attaching the push pad actuator housing 26 at the pivoting end 44 and free or swinging end 48 of the door 28 are known in art. Such hardware will vary in configuration depending upon the specific type of door construction, i.e. glass, double pane glass, or wood or metal.

With continued reference to FIGS. 7A and 7B, the push pad actuator arm 14 is attached to the push pad actuator housing 26 by means of the parallel linkage assembly 126. The parallel linkage assembly 126 includes a linear guide track 128, which is fixed to the push pad actuator arm 14; a first parallel link 130 having a first link end 136 and a second link end 138; a second parallel link 132, having a first link end 140 and second link end 142; and, a connecting rod 144. The first link ends 136 and 140 of the first and second parallel links 130 and 132 are fixed to the push pad actuator housing by means of pivot connections 150, where the pivot connections 150 each include a torsion spring 154 which serve to bias the parallel linkage assembly 126 to an outward or door locked position.

The upper link end 138 of the first parallel link 130 is pivotally connected to an end 146 of the connecting rod 144 and the upper link end 142 of the second parallel link 132 is connected to another end 148 of the connecting rod 144. Each link end to connecting rod connection includes a roller 152, i.e. the connection between upper link end 138 and connecting rod end 146 includes a roller 152 and the connection between upper link end 142 and connecting rod end 148 also includes a roller 152.

FIG. 7A, shows the push pad actuator arm 14 in its first or locked position. Upon the application of force by a user on the push pad actuator arm 14, i.e. application force 112, the biasing force exerted by the torsion springs 154 is overcome and the push pad actuator arm 14 moves inwardly to its second or unlocked position and causes the connecting tongue 38 to depress inwardly the lower link end 68 of the motion transfer link 40 and therein actuates the latching mechanism 92 and unlocks the door 28, as described in reference to FIGS. 5, 6A and 6B.

With continued reference to FIGS. 7A and 7B, in more detail the application of an actuating force 112 to the push pad actuator arm 14 causes the parallel links 130 and 132 to rotate downwardly moving from their first or locked position to their second or unlocked position. The connecting rod 144 likewise moves downwardly, from a first or locked position to a second or unlocked position, while rolling via the rollers 152 towards the pivoting end 44 of the door 28 in the linear guide track 128. Because the linear guide track 128 is fixed to the push pad actuator arm 14 and the parallel links 130 and 132 are fixed at link ends 136 and 140 to the push pad housing 26, which is fixed to the door 28, the parallel linkage assembly 126 suspends the push pad actuator arm 14 from the push pad actuator housing 26 and allows it to move between its first or locked position to its second or unlocked position.

It should be noted that because of the action of the parallel linkage assembly 126, the push pad actuator arm moves linearly inwardly towards the surface of the door 28. The push pad actuator arm 14 does not pivot (as in, for example, the embodiment disclosed in FIGS. 4A and 4B) and nor does it move laterally with respect to the push pad actuator housing 26. The alternative embodiment of the push pad actuator 12 described in FIGS. 7A and 7B provides a distinctly different "feel" from that of the embodiment described in FIGS. 4A and 4B, which may be preferred by in some installations.

Like the embodiment of the push pad actuator 12 depicted in FIGS. 4A and 4B, the alternative embodiment of the push pad actuator 13 depicted in FIGS. 7A and 7B may optionally be equipped with the manual catch or dogging assembly 60 which comprises the catch fitting 34 including the catch 62 and the slide assembly 32 including the slide member 64 and the finger extension 66 attached to the slide member 64. In both embodiments of the push pad actuator, the manual catch 60 allows a user to lock the door 28 in an unlatched position which thereby allows door to swing freely and the push pad actuator to be used as an interior door handle. The manual catch 60 is shown in the engaged position in FIG. 7B and in the disengaged position in FIG. 7A.

Likewise, in the alternative embodiment of the push pad actuator 13, the motion of the push pad actuator arm 14 may also be limited by the travel limit screws 36A and 36B.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. A push pad exit device for mounting on a door, comprising:

a push pad actuator arm oriented horizontally and parallel to a door; means for moving the push pad actuator arm from a door locked position to a door unlocked position, wherein the push pad actuator arm moves inwardly towards a surface of the door while maintaining a parallel orientation when moving from the door locked to the door unlocked position;

a latching mechanism having a door locked and a door unlocked position, the latching mechanism oriented vertically on the surface of the door;

the latching mechanism including a motion transfer link that interconnects the latching mechanism at an end of the push pad actuator arm, wherein the motion transfer link converts horizontal motion from the push pad actuator arm into vertical motion in the latching assembly;

a latch bolt assembly, the latch bolt assembly including a biasing spring that biases the push pad actuator arm and latching mechanism to their door locked positions; and wherein the application of a horizontally directed force to the push pad actuator arm overcomes the biasing force applied by the latch bolt assembly to move the push pad actuator arm and the latching mechanism to their door unlocked positions.

2. The push pad exit device of claim 1, wherein the latching mechanism includes a lever arm and an over-center link, the motion transfer link and lever arm having lower and upper ends and the over-center link having three connection points, the lower end of the motion transfer link engaging the push pad actuator arm and the upper end of the motion transfer link engaging the lower end of the lever arm by means of sliding or rolling engagement, the lower end of the lever arm having an angled surface, the upper end of the lever arm connected to a first connection point of the over-center link; the second connection point of the over-center link connected to the latch bolt assembly and the third connection point of the over-center link engaging an interior wall surface of a door handle by means of sliding or rolling engagement.

3. The push pad exit device of claim 1, wherein the latching mechanism is concealed within a door handle vertically mounted to the door.

4. The push pad exit device of claim 1, wherein the latch bolt assembly is partially concealed within a door handle vertically mounted to the door.

5. The push pad exit device of claim 1, further including a lock assembly, the lock assembly having operating means to operate a push rod, the push rod being engageable with the upper link end of the motion transfer link, wherein action of the push rod biases the motion transfer link, lever arm, over-center link and latch bolt to their unlocked positions.

6. The push pad exit device of claim 1, further including a manual catch wherein when the push pad actuator has been depressed causing the latching mechanism to unlatch, the manual catch is operable to the hold push pad actuator arm and the latching mechanism in the unlatched position.

7. The push pad exit device of claim 1, wherein the means for moving the push pad actuator arm from the door locked to the door unlocked position is a parallel linkage assembly, comprising first and second parallel links having first and second ends, the second end of the first parallel link connected to a first end of a connecting rod, and the second end of the second parallel link connected to a second end of the connecting rod, wherein the first ends of the first and second parallel links are connected to the door.

8. The push pad exit device of claim 1, wherein the lever arm is a pivoting link, pivotable between its first latched position and its second unlatched position.

9. The push pad exit device of claim 1, wherein the actuator arm is marked with indicia indicating a preferred position where a user should push on the arm.

* * * * *